May 17, 1960 W. E. MENELEY ET AL 2,936,626
LEVEL CONTROL APPARATUS
Filed May 3, 1955 3 Sheets-Sheet 2
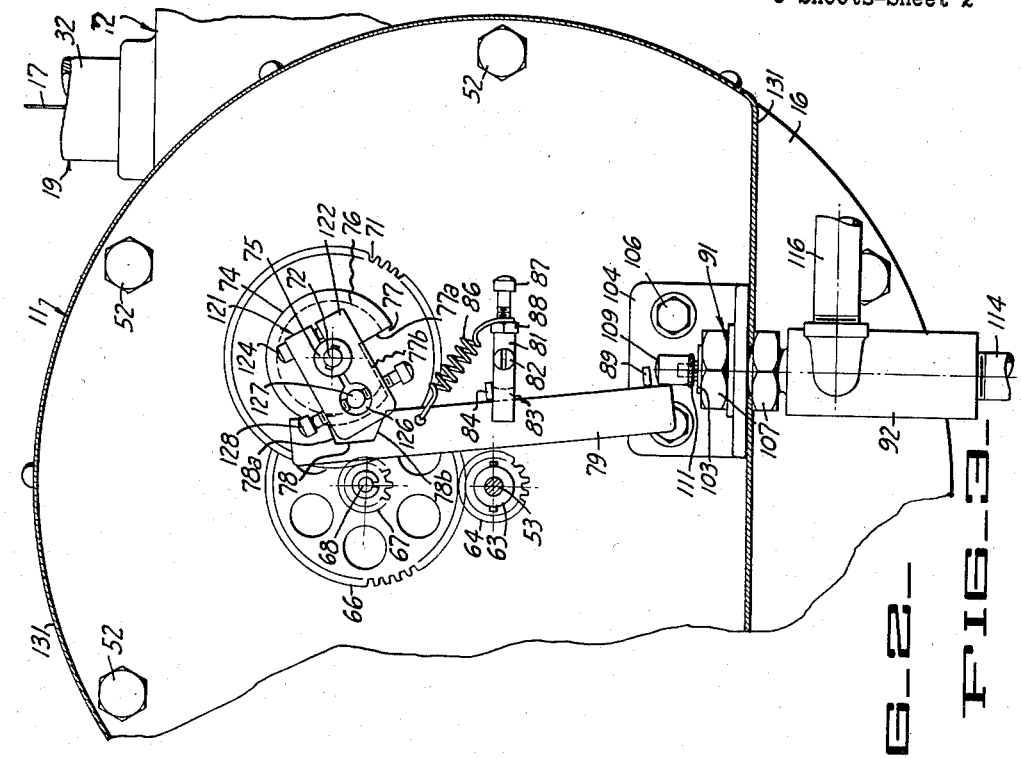
FIG_2_
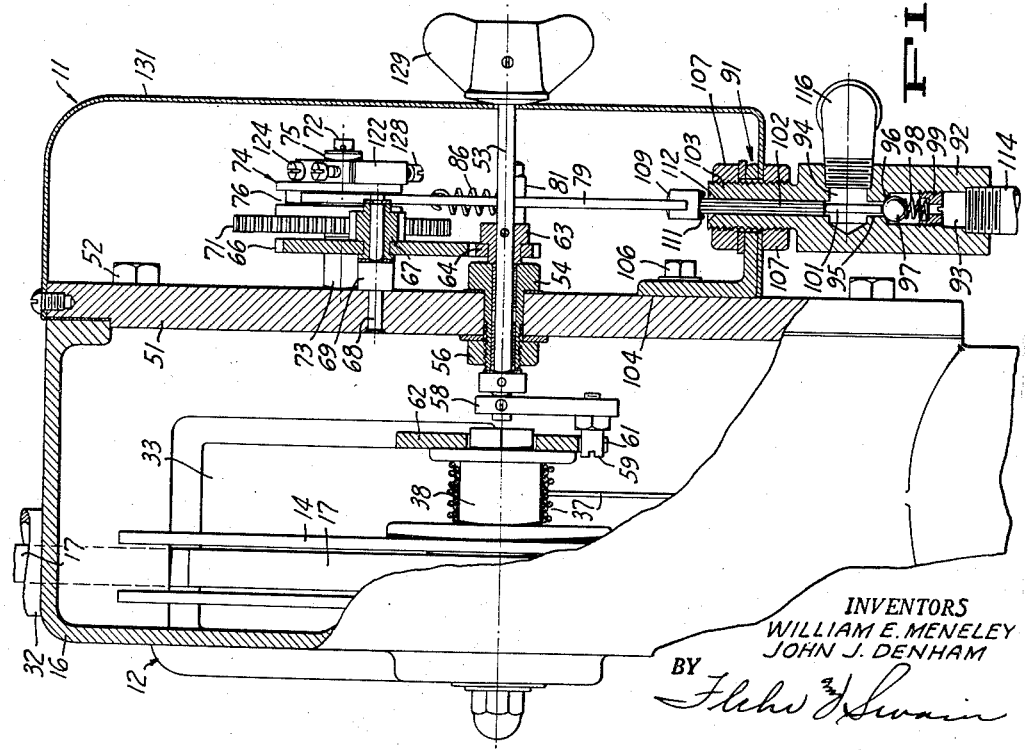
FIG_3_
INVENTORS
WILLIAM E. MENELEY
JOHN J. DENHAM
BY
ATTORNEYS

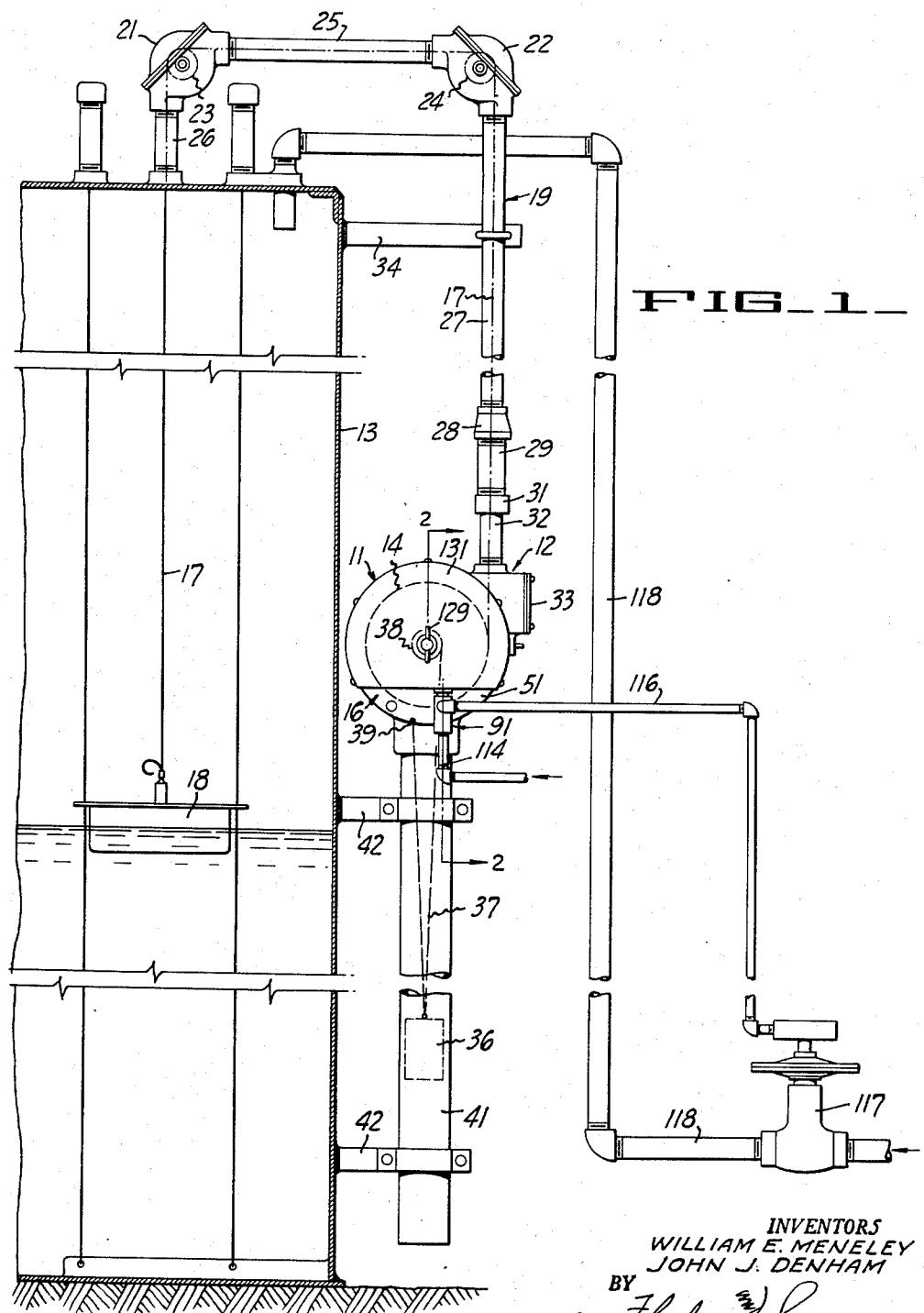

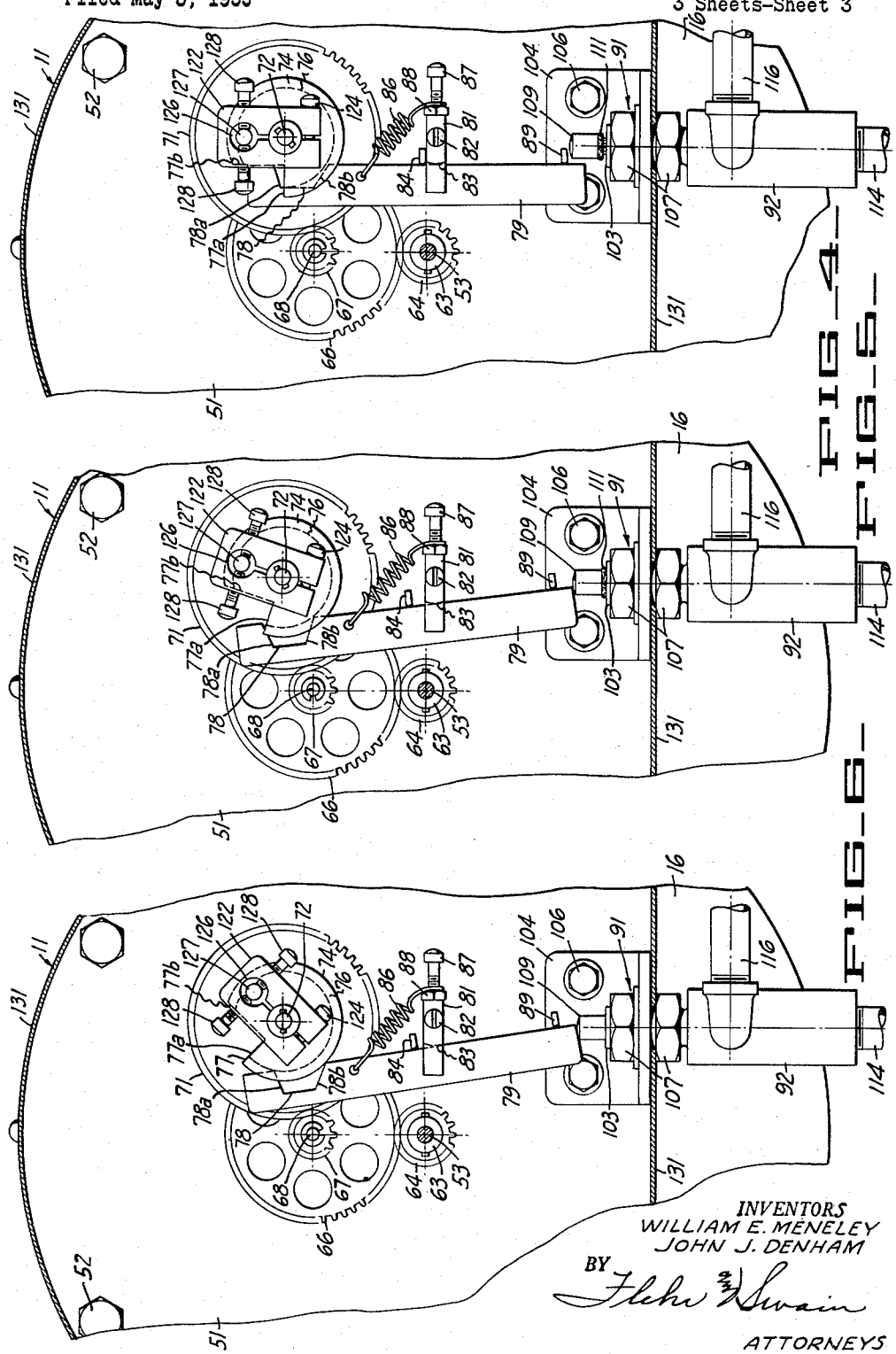

United States Patent Office 2,936,626
Patented May 17, 1960

2,936,626

LEVEL CONTROL APPARATUS

William Edward Meneley, Oakland, and John J. Denham, Orinda, Calif., assignors to Shand and Jurs Company, Berkeley, Calif., a corporation of California Application May 3, 1955, Serial No. 505,702

11 Claims. (Cl. 74—2)

This invention relates generally to liquid level control apparatus suitable for use with tanks and the like.

In many industrial applications it is desirable to control flow of liquid into or out of a tank in accordance with changes of the liquid level. One type of apparatus widely used for this purpose consists of a motor valve, such as one operated by a pneumatic diaphragm or piston, which is controlled by the positioning of a float. Application of pneumatic pressure to the motor valve may be controlled by a pilot or control valve of the supply and waste type which is mechanically connected to the float mechanism. In the past control valves and associated operating mechanisms for such apparatus have had undesirable features, including undue mechanical complications, unreliability as to functioning and lack of adaptability for different installations.

In general, it is an object of the present invention to provide level control apparatus which is particularly useful for the purpose referred to above.

Another object of the invention is to provide a compact unitary structural assembly including all the essential parts of a complete level control apparatus, and which overcomes the above mentioned objectionable features.

Another object of the invention is to provide apparatus of the above character which will operate in conjunction with liquid level indicating apparatus.

A further object of the invention is to provide apparatus of the above character which is foolproof in operation and is adaptable to various installations.

Additional objects and features of the invention will appear from the following description in which the preferred embodiment has been set forth in detail in conjunction with the accompanying drawing.

Referring to the drawing:

Figure 1 is an elevational view partly in cross-section showing a level control device embodying our invention installed with conventional indicating apparatus on a tank.

Figure 2 is a cross-sectional view taken along the line 2—2 of Figure 1.

Figures 3, 4, 5 and 6 are elevational views partly in cross section showing the working parts in various positions. Figures 4, 5 and 6 have been reduced.

In Figure 1 of the drawing, we have shown our level control apparatus 11 mounted on level indicating apparatus 12 that is connected to a tank 13. The level indicating apparatus in this instance consists of a tape drum 14 and a tape drum housing 16. Tape drum 14 carries an elongate element or tape 17 which has one end anchored to the drum and its other end connected to a suitable position sensing member such as a float 18. The tape is housed and guided within suitable means 19 carried by the tank 13 which may consist of a pair of casings 21 and 22 serving to mount and enclose the guide sheaves 23 and 24. A horizontal pipe section 25 interconnects casings 21 and 22. A pipe section 26 extends downwardly from casing 21 and is fixed to the top of tank 13. A pipe section 27 extends downwardly from casing 22 and is connected to coupling 28. Coupling 28 is connected to a pipe section 29 which extends downwardly into a slip joint 31 which is connected to a pipe section 32. Pipe section 32 is connected to reading window mounting 33 which is an integral portion of tape drum housing 16. A mounting bracket 34 is fastened to tank 13 and serves to support pipe section 27.

A counterweight 36 is carried by the looped cable 37. One end of this cable is wound about a cable drum 38 connected to tape drum 14 and the other end is anchored at 39. Counterweight 36 is disposed within a tubular housing 41 depending from tape drum housing 16 and is supported by brackets 42 which are mounted on tank 13.

The level indicating apparatus described above is representative of various equipment of this character that is available on the market.

As shown particularly in Figure 2, our level control apparatus 11 consists of a mounting plate 51 which is fastened to tape drum housing 16 by bolts 52. A shaft 53 is journalled in a flanged bushing 54 which is carried by mounting plate 51. Bushing 54 is held in place by a nut 56 which is threaded on that end of the bushing opposite the flange.

Suitable means is provided for connecting shaft 53 to tape drum 14 so that shaft 53 will rotate simultaneously with tape drum 14. One means found to be satisfactory consists of an arm 58 which has one end fixed to shaft 53 and the other end provided with a pin 59 which is adapted to cooperate with a slot 61 in a coupling plate 62 fastened to cable drum 38. Since cable drum 38 is fixed to tape drum 14, it is apparent that shaft 53 will rotate simultaneously with the rotation of tape drum 14.

A collar 63 is mounted on shaft 53 intermediate the ends thereof and a spur gear 64 is mounted on collar 63. Spur gear 64 meshes with a gear 66 which is mounted on the shoulder of a pinion 67. Pinion 67 is journalled on a stud shaft 68 which is fixed to mounting plate 51. Pinion 67 is separated from mounting plate 51 by spacing member 69 carried on stud shaft 68. Pinion 67 meshes with a gear 71 journalled on a stud shaft 72 fixed to mounting plate 51. Gear 71 is separated from mounting plate 51 by a spacing member 73 carried by stud shaft 72. A cam member 74 is journalled on a hub 75 which is an extension of gear 71. Cam member 74 is caused to rotate simultaneously with gear 71 by means hereinafter described.

Cam member 74 is provided with a groove 76 which extends around its periphery, and a notch 77 which is adapted to cooperate with a notch 78 in the upper end of a lever 79. Lever 79 is preferably an elongate member in the shape of a bar. One face 77a of notch 77 is coincident with a line forming a radius of the cam member. The other face 77b is coincident with a line forming a chord on the cam member.

The shape of notch 78 is of importance. The top face 78a of notch 78 forms an angle of substantially 90° with a line running from the left edge of face 78a to the right-hand edge of face 78b so that the lever will not rotate with cam member 74 beyond a predetermined amount. The bottom face 78b has an angle less than 90° with respect to the longitudinal axis of lever 79 as shown.

Suitable means is provided for carrying lever 79. One means found to be satisfactory consists of a guide member 81 which is fixed to mounting plate 51 by screw 82. Lever 79 is slidably mounted in a groove 83 in member 81. A pin 84 mounted on lever 79 prevents the lever from dropping downwardly through groove 83.

A spring 86 continuously urges the upper end of lever 79 to the right as viewed in Figure 3 and has one end attached to lever 79 and has the other end attached to a bolt 87 which is threaded into guide member 81. A nut 88 has been threaded on bolt 87 to adjust the tension of spring 86.

The lever 79 which is movable between cocked, tripped and released positions as hereinafter described is adapted to cooperate with control means in the form of a valve assembly 91 (Figure 2) which consists of a body 92 having inlet passage 93 and outlet passage 94 interconnected by a flow passage 95. The body is also provided with a valve seat 96 which forms a seating surface for a ball valve 97. The ball is yieldably urged towards a first control position, closed position, by a spring 98 that is supported by a retainer ring 99 mounted in inlet passage 93.

Ball valve 97 is adapted to be forced away from valve seat 96 to a second control position by a control member or valve stem 101 which has its upper portion 102 fluted for a purpose hereinafter described. The stem is slidably carried in an extension 103 of the body 92. The extension may serve to support the body in operating position. Thus it is shown connected to mounting plate 51 by an angular bracket 104 having one leg attached to mounting plate 51 by bolts 106, and its other leg attached to extension 103 by nuts 107.

Valve stem 101 is provided with a suitable operating member such as Teflon button 109. Below the lower end of button 109 there is a resilient seal ring 111 of the O-ring type which is adapted to cooperate with a seat 112 formed in the upper portion of extension 103.

The inlet passage 93 of valve assembly 91 is connected to suitable piping 114 which leads to a suitable source of pneumatic pressure (not shown). The outlet passage 94 is connected to suitable piping 116 which extends to apparatus it is desired to control, which in this instance has been shown to be a diaphragm operated valve 117 adapted to be operated by pneumatic pressure. Valve 117 is inserted in the inlet piping 118 and serves to control the flow of liquid into tank 13.

Adjustment means is provided for adjusting the trip point of our device. One means found to be satisfactory consists of a split clamp 122 which has its open end fastened to hub 75 of gear 71 by means of a screw 124. The other end of the clamp is provided with a hole 126 which fits loosely over a stud 127 mounted on cam member 74. A pair of screws 128 are provided for adjusting the position of cam member 74 with respect to gear 71. It will be apparent that the adjustment means serves to interconnect gear 71 and cam member 74 so that cam member 74 will rotate simultaneously with gear 71.

A wing nut 129 mounted on the outer end of shaft 53 is provided to allow manual rotation of shaft 53 and tape drum 14 to check the operation of the tape 17 and associated mechanism.

Any suitable enclosure may be provided for housing level control apparatus 11, such as the sheet metal cover 131.

Operation of our apparatus may now be described as follows: Let it be assumed that the apparatus is in the position shown in Figures 2 and 3 and that tank 13 is being filled. When the level control apparatus 11 is in this position, valve 117 will be in its normally open position allowing liquid to flow through piping 118 into tank 13.

It will be noted from the release position of the lever 79 as shown in Figure 3 that the bottom portion of lever 79 is resting adjacent the side of button 109 and that button 109 is in a raised position and O-ring 111 is out of engagement with seat 112 allowing the venting of outlet passage 94 via the flutted portion 102 of valve stem 101. In this position of the valve stem 101, ball valve 97 is in engagement with valve seat 96 to close the flow passage 95 connecting inlet passage 93 and outlet passage 94.

As tank 13 is filling, float 18 will gradually rise causing rotation of tape drum 14 which in turn causes rotation of shaft 53 as hereinbefore described. Upward movement of float 18 causes clockwise rotation of shaft 53 and spur gear 64. Clockwise rotation of spur gear 64 causes counterclockwise rotation of gear 66 and pinion 67. Counterclockwise rotation of pinion 67 causes rotation of gear 71 and cam member 74.

Assuming that the fluid continues to rise in tank 13, cam member 74 will continue to rotate in a clockwise direction and the upper end of lever 79 will be pulled to the right into notch 77 when notch 77 is adjacent notch 78 as shown in Figure 4. In this position, it will be noted that the upper edge of lever 79 is resting flush against side 77b of notch 77 and the lower right-hand edge of side 78b of notch 78 is resting adjacent groove 76 as viewed in Figure 4.

Continued clockwise rotation of cam member 74 causes face 77a of notch 77 to engage face 78a of notch 78 to lift the bottom end of lever 79 on top of button 109 against the tension of spring 86 as shown in Figure 5. During this movement, lever 79 pivots in groove 83 of guide 81 so that the bottom portion of lever 79 swings over button 109. It will be noted that the lower edge of face 78b is still well within groove 76 and prevents lever 79 from slipping sidewise out of the groove 76.

In the position shown in Figure 5, button 109 is still in a raised position and ball valve 97 remains seated against valve seat 96. This is called the "cocked" or "reset" position.

Continued rotation of cam 74 causes tripping of the device which is caused by lever 79 slipping out of notch 77 and allowing spring 86 to draw lever 79 downwardly to push button 109 downwardly until O-ring 111 engages seat 112 as shown in Figure 6. This may be called the tripped position of the lever 79.

At the same time valve stem 101 is forced downwardly and urges ball valve 97 away from seat 96 to allow fluid pressure to pass from inlet passage 93 into outlet passage 94 through flow passage 95 into piping 116 to cause operation of diaphragm operated valve 117 which prevents further filling of tank 13.

It should be pointed out that our level control apparatus is generally set so that the trip point is reached when float 18 reaches the top of the tank 13. To set the level control apparatus so that it will trip at the proper point, the following procedure is used. First, the level indicating apparatus 12 is set to give a correct reading at the reading window 33. The float in the tank is then raised until the gauge reading is equal to the level at which it is desired to have the level control apparatus tripped and is held in that position. Screw 124 is loosened so that clamp 122 may be rotated relative to hub 75. Clamp 122 and cam member 74 are then rotated until the level control apparatus is just about ready to trip. Screw 124 is again tightened to fasten clamp 122 to hub 75. The clamp and cam would be in a position very similar to that shown in Figure 5.

Clamp 122 is then rotated very slowly in a clockwise direction as viewed in Figure 5 by means of the adjusting screws 128 by loosening the right-hand screw about 15° and tightening the left-hand screw 15° in sequence until lever 79 trips off of cam notch 77.

After this has been accomplished, float 18 can be lowered and then raised to check the trip point. If the trip point is still too far from the desired setting, it may be adjusted again by adjusting screws 128 in a manner hereinbefore described.

Assume now that fluid is being drained from tank 13 and that float 18 is falling. Gear 71 and cam member 74 will be rotated counterclockwise by tape drum 14. As cam notch 77 passes into the upper edge of notch 78 in lever 79, the top of the lever will be pulled to the right as shown in Figure 5 and will pivot in groove 83 in guide member 81 causing the lower end of lever 79 to move to the left as viewed in Figure 5 until it slips off of button 109 as shown in Figure 4. Release of button 109 allows valve stem 101 to snap upwardly due to the action of spring 98 which causes ball valve 97 to seat against valve seat 96 and unseats O-ring 111 from seat 112. Closure of the ball valve closes flow passage 95. Unseating of O-ring 111 vents outlet passage 94 to the atmosphere which allows operation of control valve 117 to its normally open position by releasing the pressure on the diaphragm of the valve.

As the level in tank 13 continues to fall, the upper portion of lever 79 rides out of cam notch 77 into groove 76 as shown in Figure 3. The bottom portion of the lever 79 continues to ride to the left of button 109 as shown in Figure 3. Lever 79 will remain substantially in this position until tank 13 is emptied.

It is apparent that the gear ratio of spur gears 64, gear 66, pinion 67 and gear 71 must be such that movement of float 18 from its lowermost position to its uppermost position will cause slightly less than 360° rotation of cam member 74. If this were not true, the level control apparatus would trip twice during a filling operation which would be undesirable.

Pin 84 has been provided on lever 79 and acts in conjunction with spring 86 to retain lever 79 in groove 83 which provides a fulcrum or pivot point for lever 79. Pin 89 has been provided to prevent valve stem 101 from springing out of extension 103 when button 109 is released.

When liquid is again pumped into tank 13 through piping 118, float 18 will again rise and the same cycle of operation as hereinbefore described will again occur, i.e., control valve 117 will be operated when tank 13 is filled.

It is apparent that our apparatus can be utilized in many different installations. We can mount additional cam members on the same shaft to control additional devices, e.g. to slow down the pumping as the liquid level reaches the top of the tank or to cut off one pump if more than one pump is being used. The apparatus may also be used to control the discharge of liquid from a tank. For example, a valve in the outlet piping can be closed when the liquid level falls to a predetermined level by reversing the gearing so that the cam member is rotated in the opposite direction and moving the lever to the other side of the cam member so that the lever will trip when the predetermined level is reached.

It is apparent that we have provided level control apparatus which is simple in construction and reliable in operation. It can be readily adjusted to meet various control requirements, and it can be adapted to a wide variety of installations.

We claim:

1. In a control apparatus of the type which is automatically reset and which is adapted to be used with apparatus of the type having a position sensing member and an element positioned according to said member; a rotatable cam member adapted to be positioned by said element, control means including a control member movable toward and away from said cam member and into first and second control positions, means for yieldably urging said control member towards said first control position, and means cooperating with both said cam member and said control member for normally retaining said control member in its second control position and against the urging of the yieldable means, said control member being released by said last named means upon movement of said cam member to one angular position to permit movement of said control member from its second to its first control position solely, said control member being automatically returned to its second position by said last named means upon movement of said cam member to another angular position.

2. Apparatus as in claim 1 wherein said last named means includes a lever engaging said cam member and having one end adapted to engage said control member, said lever being movable between cocked, tripped and released positions, said control member in cocked and released positions of said lever being in its first position and in a tripped position of said lever being in its second position.

3. Apparatus as in claim 1 wherein said last named means includes a lever which is lifted by said cam member and then tripped when said control member is automatically returned to its second position.

4. In a control apparatus adapted to be used with apparatus of the type having a position sensing member and an element positioned according to said member; a rotatable cam member adapted to be positioned by said element, control means including a control member movable toward and away from said cam member and into first and second control positions, means for yieldably urging said control member towards said first control position, means including a lever cooperating with both said cam member and said control member for normally retaining said control member in its second position against the urging of the yieldable means, said last named means including means for yieldably urging said lever into engagement with said cam member, said control member being released by said lever upon movement of said cam member to one angular position to permit movement of said control member from its second to its first control position, said control member being automatically returned to its second position solely by said lever as said lever is lifted by said cam member against the urging of the yieldable means and then tripped by movement of said cam member to another angular position.

5. Apparatus as in claim 4 wherein said cam member and said lever are provided with cooperating notches.

6. In control apparatus adapted to be used with apparatus of the type having a position sensing member and an element positioned according to said member; a rotatable cam member adapted to be positioned by said element, said cam member being formed with a notch in its outer margin, control means including a control member movable toward and away from said cam member and into first and second control positions, means for yieldably urging said control member towards its first control position, and means cooperating with both said cam member and said control member for normally retaining said control member in its second control position and against the urging of the yieldable means, said control member being released by said last named means upon movement of said cam member to one angular position and being automatically returned to its second position by said last named means upon movement of said cam member to another angular position, said last named means comprising a lever having a notch at one end cooperating with the notch in said cam member, means forming a fulcrum for said lever intermediate its ends, and means yieldably urging the notched end of said lever toward said cam member.

7. A control apparatus as in claim 6 wherein said control member is returned to its second position by lifting of said lever against the urging of the means for urging the notched end of the lever towards said cam member and then tripped by said cam member.

8. In control apparatus adapted to be used with apparatus of the type having a position sensing member and an element positioned according to said member; a mounting plate, a rotatable cam member mounted on said mounting plate and adapted to be positioned by said element, said cam member being formed with a notch in its outer margin and a groove on its periphery, a lever having a notch at one end and cooperating with the groove and notch on said cam member, means on said mounting plate forming a fulcrum point for said lever intermediate the ends of the same, means for yieldably urging the notch in said lever towards said cam member, control means mounted adjacent the other end of said lever, said control means including a control member movable toward and away from said cam member and into first and second control positions, means for yieldably urging said control member towards its first control position, said control member being normally and releasably engaged by the other end of said lever to retain said control member in its second control position against the urging of said yieldable means, the notches in said cam member and in said lever being shaped so that the other end of said lever will release said control member when said cam member reaches a predetermined angular position to permit said control member to move from its second to its first position.

9. Apparatus as in claim 8 wherein said control member will be automatically returned to its second position by lifting and then tripping of said lever by said cam member upon movement of said cam member to another predetermined angular position.

10. In control apparatus adapted to be used with apparatus of the type having a float and a shaft positioned according to said float; a mounting plate, said shaft being journalled in said mounting plate, a cam member rotatably carried by said shaft and adapted to be rotated thereby through substantially 360°, the cam member being formed with a notch in its outer margin and with a groove on its periphery, control means including a control member movable toward and away from said cam member and into first and second control positions, means for yieldably urging said control member towards its first control position, a lever having a notch at one end and adapted to cooperate with the notch and groove in said cam member, the other end of the lever being adapted to releasably engage said control member, means on said mounting plate forming a fulcrum for said lever intermediate the ends of the same, and means for yieldably urging the notched end of said lever towards said cam member, said control member being tripped by said lever upon movement of said cam member to one angular position, said control member being automatically returned to its second position by said lever when said lever is first lifted and then tripped by movement of said cam member to another angular position.

11. Apparatus as in claim 10 wherein said notch in said cam member is formed by one face on said cam member coincident with a radius of said cam member and another face coincident with a line defining a chord on said cam member.

References Cited in the file of this patent

UNITED STATES PATENTS

| | | |
|---|---|---|
| 168,245 | Ferguson | Sept. 28, 1875 |
| 1,388,632 | Dean | Aug. 23, 1921 |
| 2,296,219 | Miller | Sept. 15, 1942 |
| 2,554,260 | Mueller | May 22, 1951 |